US010893777B2

(12) United States Patent
Gross

(10) Patent No.: US 10,893,777 B2
(45) Date of Patent: Jan. 19, 2021

(54) COOKING GRILL IGNITION SYSTEM

(71) Applicant: James Gross, San Clemente, CA (US)

(72) Inventor: James Gross, San Clemente, CA (US)

(*) Notice: Subject to any disclaimer, the term of this patent is extended or adjusted under 35 U.S.C. 154(b) by 0 days.

(21) Appl. No.: 14/748,145

(22) Filed: Jun. 23, 2015

(65) Prior Publication Data
US 2015/0289718 A1 Oct. 15, 2015

Related U.S. Application Data

(63) Continuation-in-part of application No. 14/617,495, filed on Feb. 9, 2015, now abandoned.

(60) Provisional application No. 62/015,863, filed on Jun. 23, 2014, provisional application No. 61/937,462, filed on Feb. 7, 2014.

(51) Int. Cl.
*A47J 37/07* (2006.01)
*F23Q 7/16* (2006.01)
*F23Q 7/04* (2006.01)
*F23Q 7/02* (2006.01)

(52) U.S. Cl.
CPC .............. *A47J 37/079* (2013.01); *F23Q 7/02* (2013.01); *F23Q 7/04* (2013.01); *F23Q 7/16* (2013.01)

(58) Field of Classification Search
CPC .. A47J 37/079; F23Q 7/16; F23Q 7/04; F23Q 7/02
USPC ........................................ 219/261; 126/25 B
See application file for complete search history.

(56) References Cited

U.S. PATENT DOCUMENTS

| | | | | |
|---|---|---|---|---|
| 3,209,712 A | * | 10/1965 | Arena | A47J 37/079 126/162 |
| 3,223,858 A | * | 12/1965 | Martini | H01J 45/00 310/306 |
| 4,431,402 A | * | 2/1984 | Hamilton | F23G 7/08 431/202 |
| 4,788,905 A | * | 12/1988 | Von Kohorn | A47J 37/0781 126/25 R |
| 6,118,645 A | * | 9/2000 | Partridge | H01T 23/00 250/423 R |
| 2002/0046643 A1 | * | 4/2002 | Breuer | F41A 19/70 89/28.05 |
| 2012/0090593 A1 | * | 4/2012 | Urquhart | A47J 37/079 126/25 B |
| 2012/0251958 A1 | * | 10/2012 | Gross | F23Q 7/04 431/2 |
| 2013/0064567 A1 | * | 3/2013 | Akama | G03G 21/206 399/90 |
| 2014/0038117 A1 | * | 2/2014 | Tannous | F23Q 7/02 431/258 |

(Continued)

*Primary Examiner* — Dana Ross
*Assistant Examiner* — Kuangyue Chen

(57) ABSTRACT

An Electro-Mechanical Pulse Generator ("EMPG") may be used to ignite an ignition pad comprising of fine carbon steel fibers. When electrical energy is applied to the carbon steel fibers, the carbon steel ignites thus starting the combustion of the fuel in a fuel basket located within the grill's combustion chamber. An electrical control panel connects an energy source such as a battery with an ignition wire positioned within the combustion chamber of the grill. A fan positioned below or near the fuel basket controls the amount of air flow into the combustion chamber to aid in initially lighting the fuel as well as controlling the temperature of the grill and the amount of combustion used to heat the food that is cooking.

5 Claims, 8 Drawing Sheets

(56) References Cited

U.S. PATENT DOCUMENTS

2018/0110366 A1\* 4/2018 Denning ............... A47J 37/079

\* cited by examiner

COOKING GRILL IGNITION SYSTEM

CLAIM OF PRIORITY

This application claims priority to U.S. Provisional Patent Application Ser. No. 62/015,863 filed on Jun. 23, 2014, titled "Cooking Grill Ignition System;" U.S. patent application Ser. No. 14/617,495 filed on Feb. 9, 2015, titled "Fire Starting System;" and U.S. Provisional Patent Application Ser. No. 61/937,462 filed on Feb. 7, 2014, titled "Fire Starting Ignition Pad" all of which are incorporated in its entirety by reference.

BACKGROUND OF THE INVENTION

1. Field of the Invention

This invention provides an ignition system for a cooking grill. Specifically, this invention relates to a device that when coupled with a fuel pouch ignites the fuel pouch so that food can be cooked on a cooking grill.

2. Related Art

One way to ignite a cooking grill is by dousing charcoal with lighter fluid made out of highly volatile petrochemical products. Among the many disadvantages associated with this method is that it is dangerous to handle highly volatile petrochemical products close to an open fire. Another disadvantage is the large amount of hydrocarbons that the lighter fluid produces when burning. Another disadvantage associated with using petroleum products is that these petroleum products occasionally give the cooked food an off-flavor.

Coupled with a blower that provides additional oxygen to the mix and the highly volatile petroleum products, an explosion of the combustion fuel is extremely dangerous to the folks who are lighting the fire and cooking the food. The problem with using a regular handheld air supply blower to ignite fixed fuel such a charcoal on an open bed is that it has too low an outlet temperature given the loss of energy in an open bed such as in an open charcoal grill. This means that the ignition will at best take quite long time or will not work at all. Further, repeated such use of a regular air supply will dramatically shorten its expected lifespan of the grill as they are typically not intended for extended periods of high temperatures after the initial ignition of the fuel.

Thus, a need exists for a cooking grill that utilizes an air blower and a combustion process that does not involve highly volatile petroleum products. Another need is for the igniter to have a heat resistant design so that it can withstand the heating and re-heating of the cooking grill without burning the steel comprising the ignition wires.

SUMMARY

This invention relates to a cooking grill with an ignition system that provides for lighting of a fuel packet without the need for use of volatile petroleum products to ignite the fuel. This does not mean that this cooking system eliminates the use of volatile petroleum products to assist in the starting of the barbeque grill fuel. Instead, it makes the use of petroleum products in the start of the combustion of the fuel optional.

An Electro-Mechanical Pulse Generator ("EMPG") may be used to ignite an ignition pad comprising of fine carbon steel fibers. When electrical energy is applied to the carbon steel fibers, the carbon steel ignites thus starting the combustion of the fuel in a fuel basket located within the grill's combustion chamber. An electrical control panel connects an energy source such as a battery with an ignition wire positioned within the combustion chamber of the grill. A fan positioned below or near the fuel basket controls the amount of air flow into the combustion chamber to aid in initially lighting the fuel as well as controlling the temperature of the grill and the amount of combustion used to heat the food that is cooking.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

DETAILED DESCRIPTION

Figure 1:
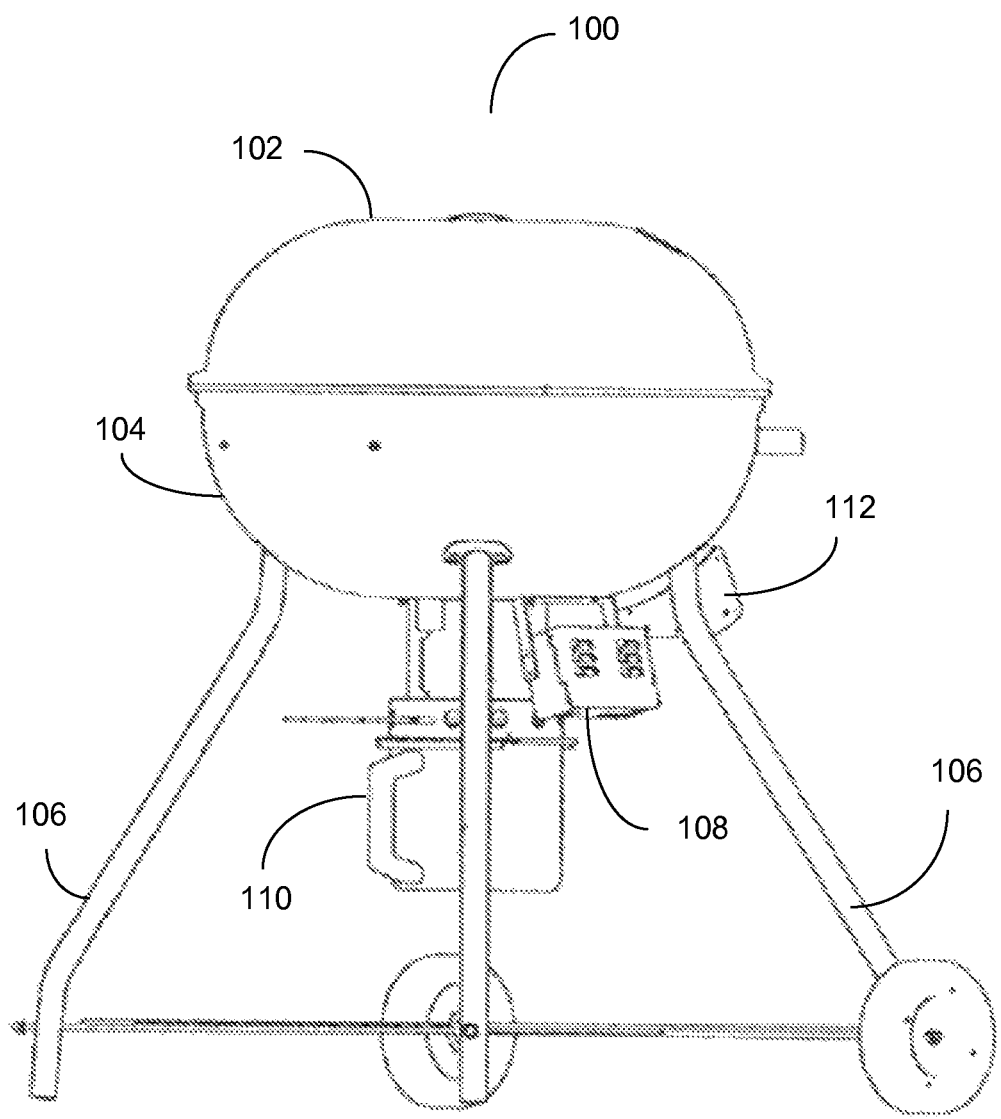
FIG. 1 is a side perspective view of a grill system.

FIG. 1 is a side perspective view of a grill system. The grill system 100 comprises a lid 102, a combustion chamber 104, a plurality of legs 106, a motor inside a motor housing (not shown), battery box 108, ash can 110 and electronics housing 112. The ash can 110 is positioned below a fan motor housing and the combustion chamber 104 and collects the ashes from the combustion of fuel within the combustion chamber 104. The battery box 108 provides energy for the ignition of fuel within the combustion chamber 104 as well as electrical energy for any electrical sensors that may be connected and used with the grilling system such as lights, temperature probes, air flow, etc. The electronics housing 112 can provide an on/off switch or control the amount of airflow into the combustion chamber 104 or provide an analog or digital readout for the temperature probe.

Figure 2:
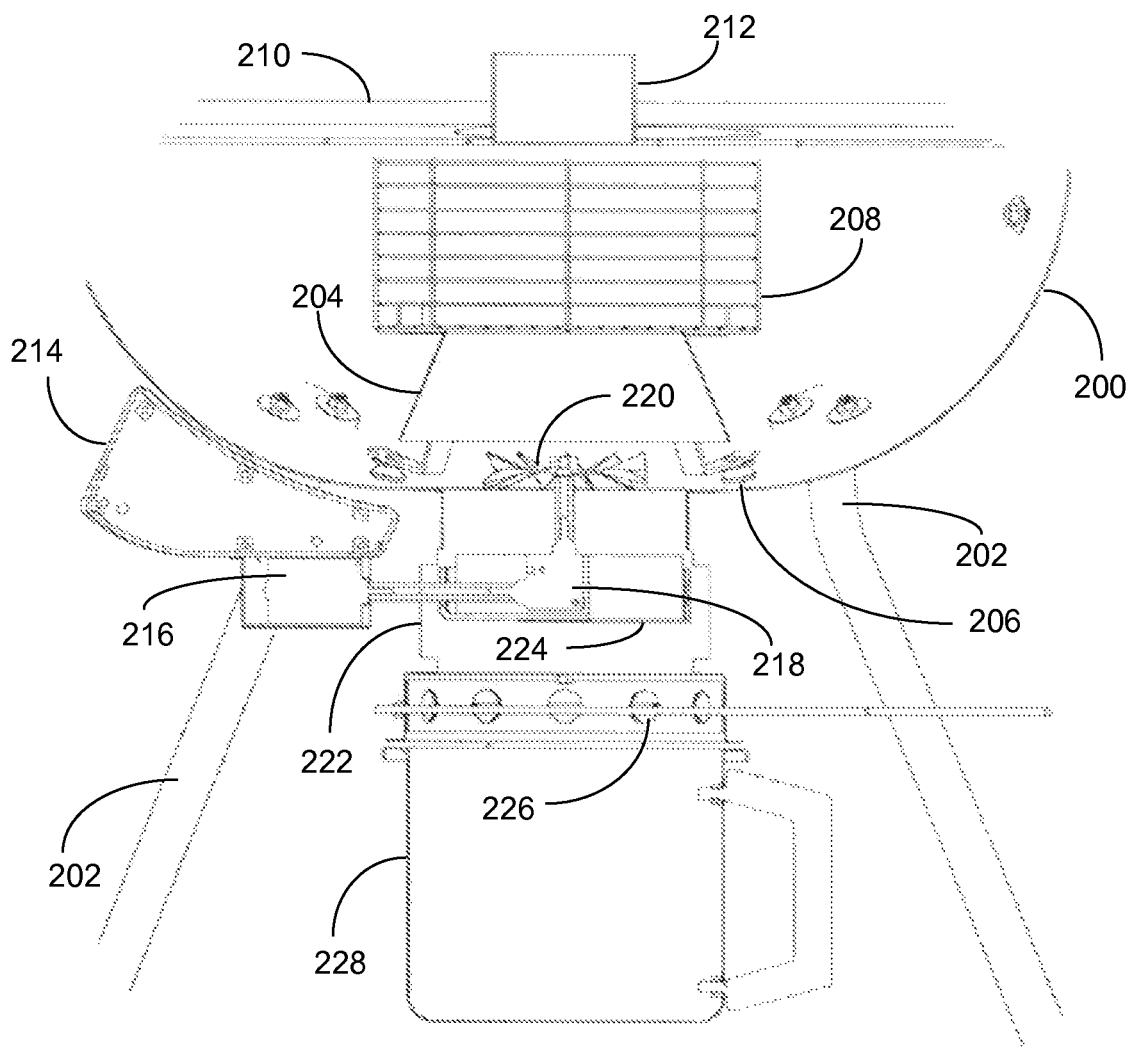
FIG. 2 is a side cut away view of the grill system.

FIG. 2 is a side cut away view of the grill system. The combustion chamber 200 is supported by legs 202. The combustion chamber also supports an air diverter 204 that is electrically isolated by insulators 206 from the combustion chamber 200. A fuel basket 208 positioned above the air diverter 204 holds charcoal, wood chips or other combustion fuels as well as an ignition pad that when energized assists in igniting the fuel held in the fuel basket 208. Positioned above the fuel basket 208 is the grill grate 210. A collar or cylindrical housing 212 can be positioned in or near the center of the grill grate 210 so that additional fuel can be added to the fuel basket 208 once cooking begins. The collar 212 also provides the user the protection necessary to avoid food from dropping into the fire below the grill grate 210.

An electronics housing 214 provides an on/off switch to a fan motor 216 that is coupled to a fan drive system 218 for operating the fan 220. A variable speed on the fan motor 216 can regulate the amount of air flowing into the combustion chamber 200 to provide for temperature control during the cooking process. The fan may be positioned within the combustion chamber 200 or outside the combustion chamber 200 where the fan blades may be exposed to a lower heat extending their life so that the air generated by the fan is directed into the combustion chamber 200.

A lower housing assembly 222 may be positioned below the combustion chamber 200 and a fan drive system protector 224 can protect the fan drive system 218 from hot ashes and hot coals that fall out of the combustion chamber 200. Air holes 226 can allow air into the lower housing assembly 222 for input into the combustion chamber 200. An ash collector 228 can be fitted to the bottom portion of the lower assembly 222 for collecting ash and debris from the combustion process.

Figure 3:
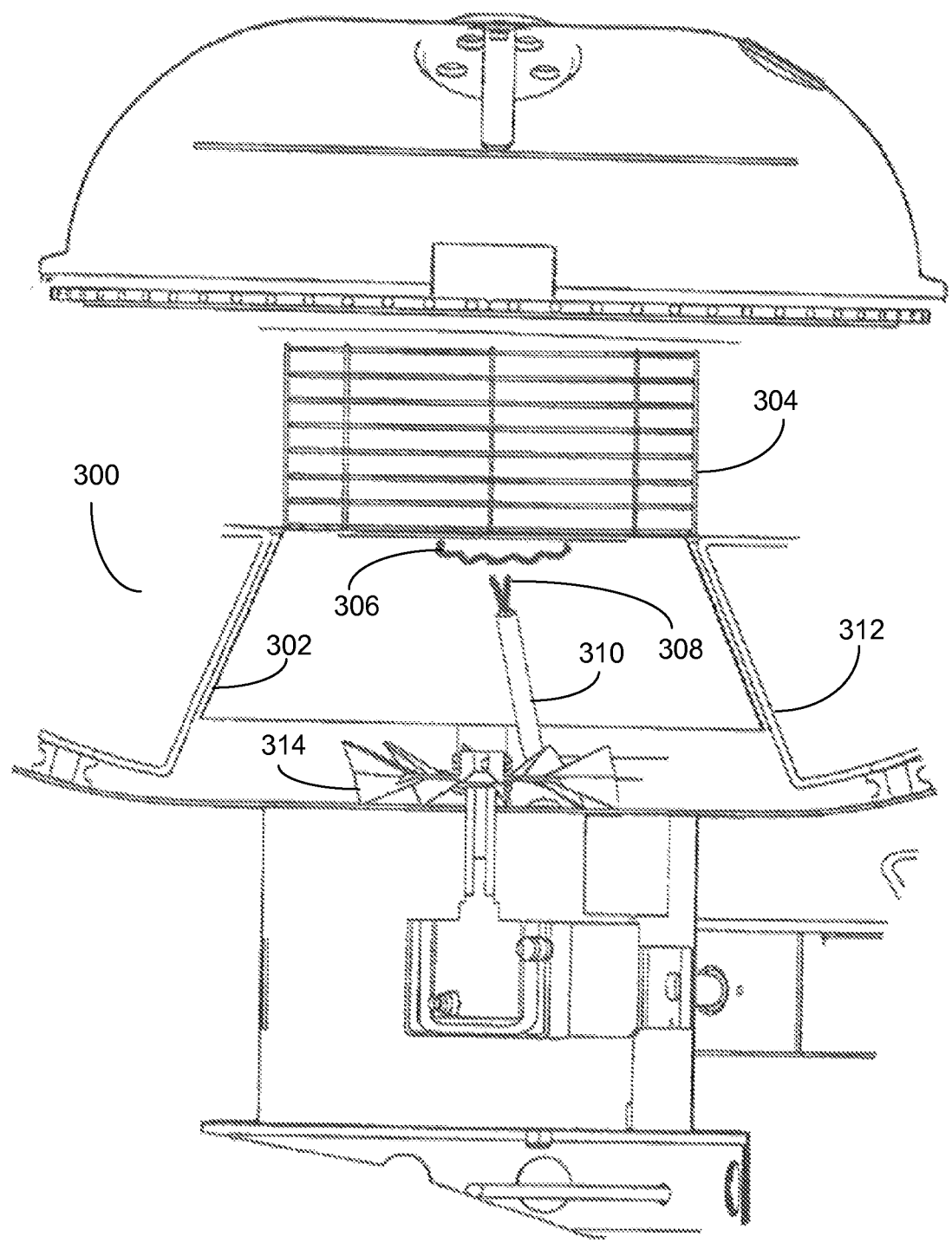
FIG. 3 is a side cut away view of the grill system.

FIG. 3 is a side cut away view of the grill system. Within the combustion chamber 300, the air diverter 302 supports the fuel basket 304. An ignition pad 306 may be positioned below the fuel basket 304. The fuel basket 304 is designed for multiple purposes. One purpose is to hold the ignition pad 306 directly over the Electro-Mechanical Pulse Generator ("EMPG"). When electrical energy is applied to the carbon steel fibers, the carbon steel ignites thus starting the combustion of the fuel in a fuel basket located within the grill's combustion chamber. The EMPG comprises at least one ignition wire 308, a protective EMPG tube 310, an energy source such as a battery (not shown) and an energy cut off switch (not shown). The ignition wire 308 may be moved into position or the ignition pad 306 may be in placed in contact or in very close communication between the ignition wire 308 and the ignition pad 306 such that when the ignition wire 308 is energized, the ignition pad 306 combusts thus further igniting the fuel within the fuel basket 304.

Positioning the fuel basket 304 in the center of the combustion chamber 300 acts to provide a relatively even cooking environment within the combustion chamber and acts to prevent the overloading of fuel. The fuel basket 304 may sit on top of the fuel basket support brackets 312 that provide additional structural support for the fuel and the fuel basket 304. The fuel basket support brackets 312 may be insulated from the main body of the grill to allow for positive or negative charge to flow through to the fuel basket 304 and the ignition pad so that the EMPG is oppositely charged thus inducing the electrical pulse needed to ignite the ignition pad 306. The air diverter 302 may be placed over a fan 314 to direct the air to the bottom side of the fuel basket 304.

Figure 4:
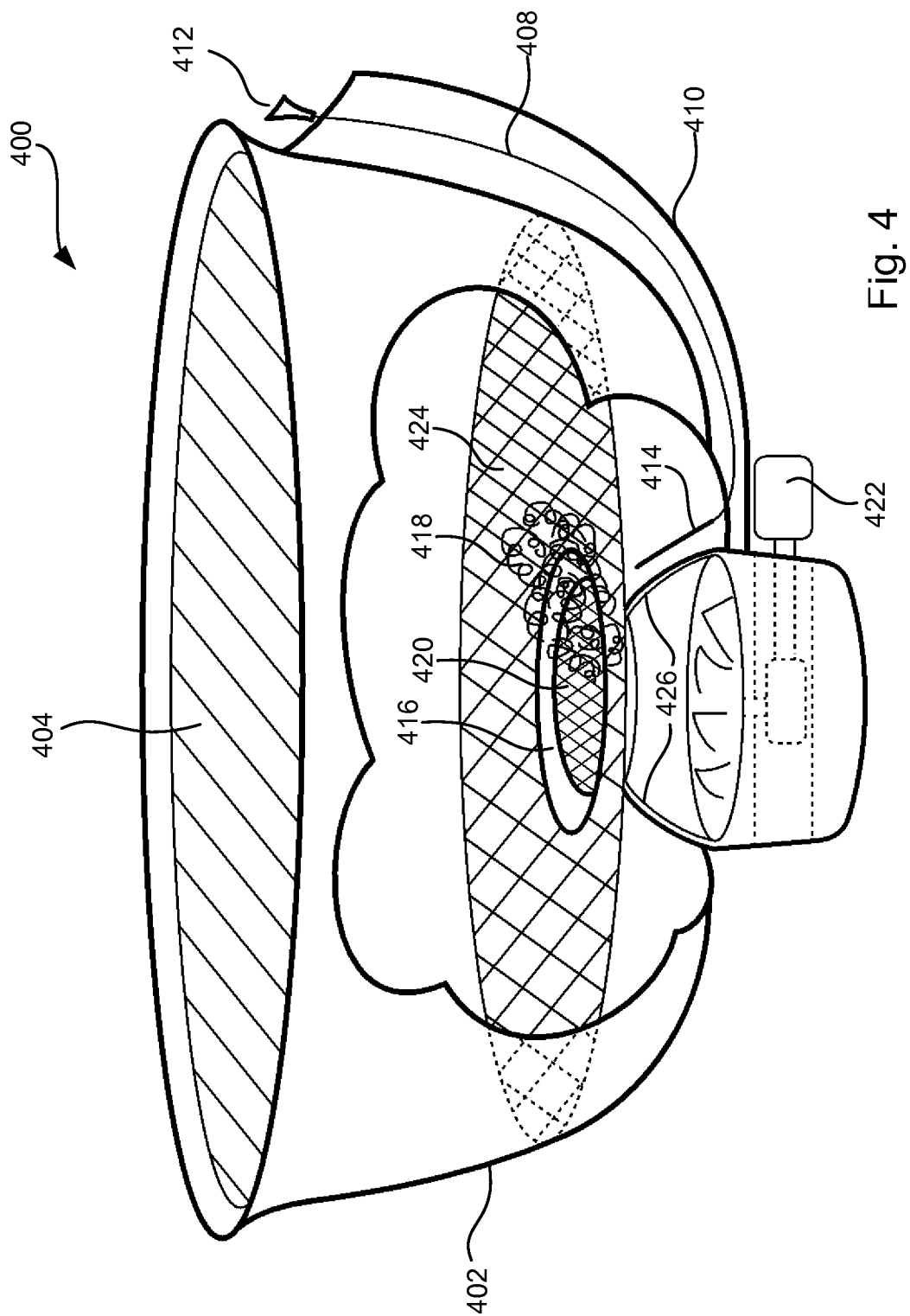
FIG. 4 is a perspective view of a cut away of a cooking grill illustrating the fuel ignition system.

FIG. 4 is a perspective view of a cut away of a cooking grill illustrating the fuel ignition system. The cooking grill 400 comprises an outer housing or kettle 402. The outer housing 402 acts to contain the fuel, fire, lit coals and embers that are used to cook the food. A cooking rack 404 is positioned within the outer housing 402 so that it can support the food above or adjacent to the fire or lit coals within the cooking grill 400.

As part of the cooking grill 400, an EMPG (not shown) may be positioned on the bottom or side of the outer housing 402. In FIG. 4, the electrical mechanical pulse generator comprises a ridged wire 408, protective housing 410, a protective tube 414, a push button 412 and a power source (not shown). The ridged wire 408 is located in a protective housing 410 that extends from below the outer housing 402 and up the side to near the lip or rim of the outer housing 402. The mechanical activator uses the push button 412 connected to the rigid wire 408 to extend the ignition wire end into the combustion chamber 416.

The rigid wire 408 has a forked end (not shown) on the end that extends into the combustion chamber 416. When the push button 412 is pressed, the forked end of the ridged wire 408 extended beyond the heat resistant protective tube 414 and into a fuel packet 418. When the push button 412 is not pressed, a spring (not shown) allows the end of the rigid wire 408 to retract into a protective tube 414 such that the end of the rigid wire 408 is protected from the heat of the combustion chamber 416. When the push button 412 is pressed again, the spring compresses and the rigid wire 408 once again extends out of the protective tube 414 and into the combustion chamber 416.

Connected to the rigid wire 408 is an electrical charging mechanism (not shown) that may be connected to an electrical outlet or to a battery pack (not shown). The electrical contacts make a circuit by connecting one of the leads from the battery or electrical transformer to the outer housing 402 or one of the fuel support grills 420 or 424. The other lead is connected to the ridged wire 408 so that when the electrical ignition switch is turned on a circuit is made thus igniting a steel wool pad located within the fuel packet 418 sitting on the fuel support rack 420 and 424. In alternative configurations, the electrical leads are connected to the separate fuel support rack 420 and 424. A blower motor 422 can pump air into the bottom of the combustion chamber 416 to enhance the combustion so that wood is consumed so that coals are quickly formed or coals formed from charcoal briquettes. Legs 426 form structural support for the fuel support rack 420 and 424.

The upper fuel support rack 424 can be arranged so that the fuel packet 418 is placed on a lower fuel support rack 420 and partially on the upper fuel support rack 424. The fuel packet 418 may include charcoal briquettes, wood and/or a steel mesh similar to steel wool. The cooking rack 404 can be configured such that it completely covers the upper area of the outer housing 402. In an alternative embodiment, the center area of the cooking grill 404 can be removed. The fuel or a fuel packet 418 can be positioned in the center area forming the combustion chamber. To aid combustion, the fuel support rack 420 can be positioned above the inner wall of the outer housing 402. The fuel packet 418 can be positioned on top of the fuel support rack 418 and within the open area that forms the combustion chamber 416 of the cooking grill 402.

Figure 5:
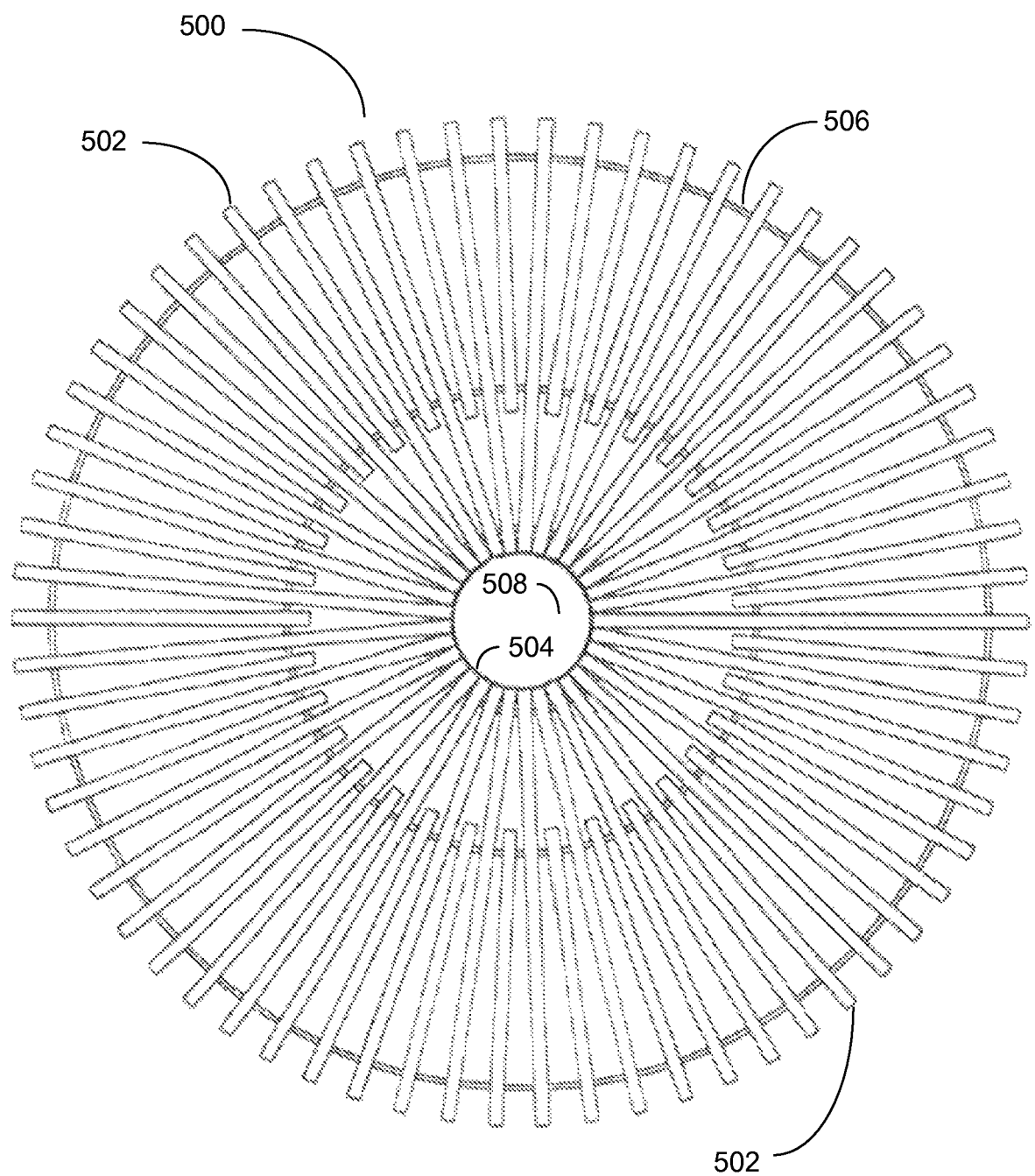
FIG. 5 is a top view of a grill grate.

FIG. 5 is a top view of a grill grate plate. The grill grate plate 500 comprises a plurality of rods 502 radiating from a circular center 504. Mounted and holding the plurality of rods 502 are stabilizing circular members 506. One embodiment of the grill grate plate 500 comprises a circular opening 508 for allowing additional fuel to be added underneath the grill grate plate 500 during the cooking process. Another embodiment can include the attachment of a cylinder housing or collar (not shown) within the circular opening 508 to assist in getting the fuel into an area beneath the grill grate plate 500 for combustion during the cooking process.

Figure 6:
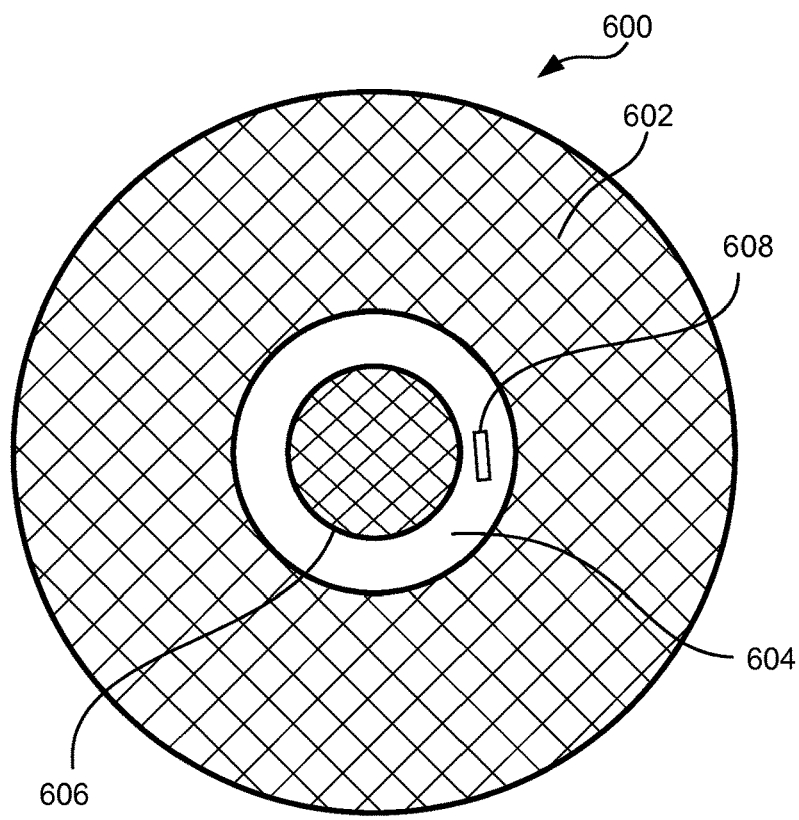
FIG. 6 is a top view of the charcoal support rack.

FIG. 6 is a top view of a fuel support rack illustrating two fuel support racks 602 and 606. In such an embodiment, a top rack may be used to cook food while bottom rack(s) may be employed to support the fuel such as charcoal briquettes.

The fuel support rack 602 may be arranged and positioned in the mid-section of the cooking grill 400. An inner area 604 may separate the fuel support grill 602 from the fuel support rack 606. In an alternative arrangement a metal sleeve (not shown) could connect the fuel support rack 602 and 606. However, in a typical configuration this inner area 604 has a space separating the two fuel support racks 602 and 606. The diameter of the open inner section of the upper fuel support rack 602 may have a diameter greater than or less than the outer diameter of the fuel support rack 606. A protection tube 608 may be positioned and located below the fuel support rack 602 or fuel support rack 606 and acts to protect the ignition wires that can be pushed out of the protection tube 608 to ignite a fuel packet and then withdraw within the protection tube during times when combustion is occurring in the combustion chamber.

Figure 7:
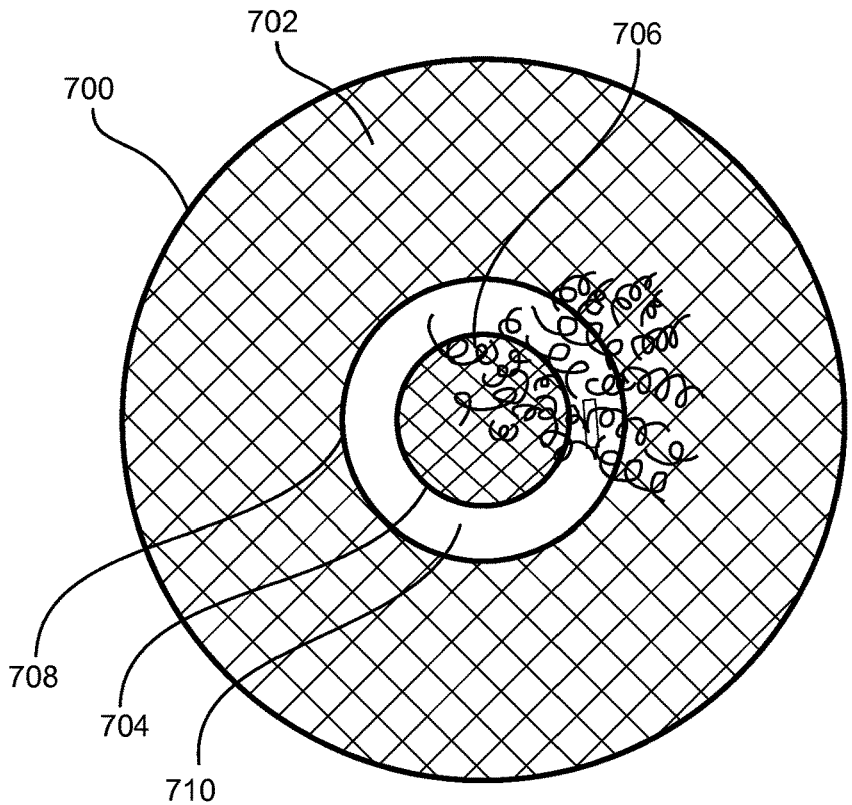
FIG. 7 is a top view of the charcoal support rack with a fuel packet located in the center section.

FIG. 7 is a top view of the fuel support rack 700 of a cooking grill system showing the two fuel support racks 702 and 704. The top fuel support rack 702 provides some support for the fuel packet 706 while part of the support for the fuel packet 706 is provided by the inner fuel support rack 704. The upper fuel support rack 702 may have an opening in the center area 708 of the cooking grill 700. From the top view, the opening in the center area 708 of the upper fuel support rack 702 is larger than the outside diameter of the fuel support rack 704. However, the lower fuel support rack 704 could be designed such that it has a larger diameter than the opening in the center area 708 of the fuel support rack 702, thus forming concentric circles when viewed from above. The open area 710 may be configured so that ashes and coals from the fuel packet pass down into the lower area of the combustion chamber.

Figure 8:
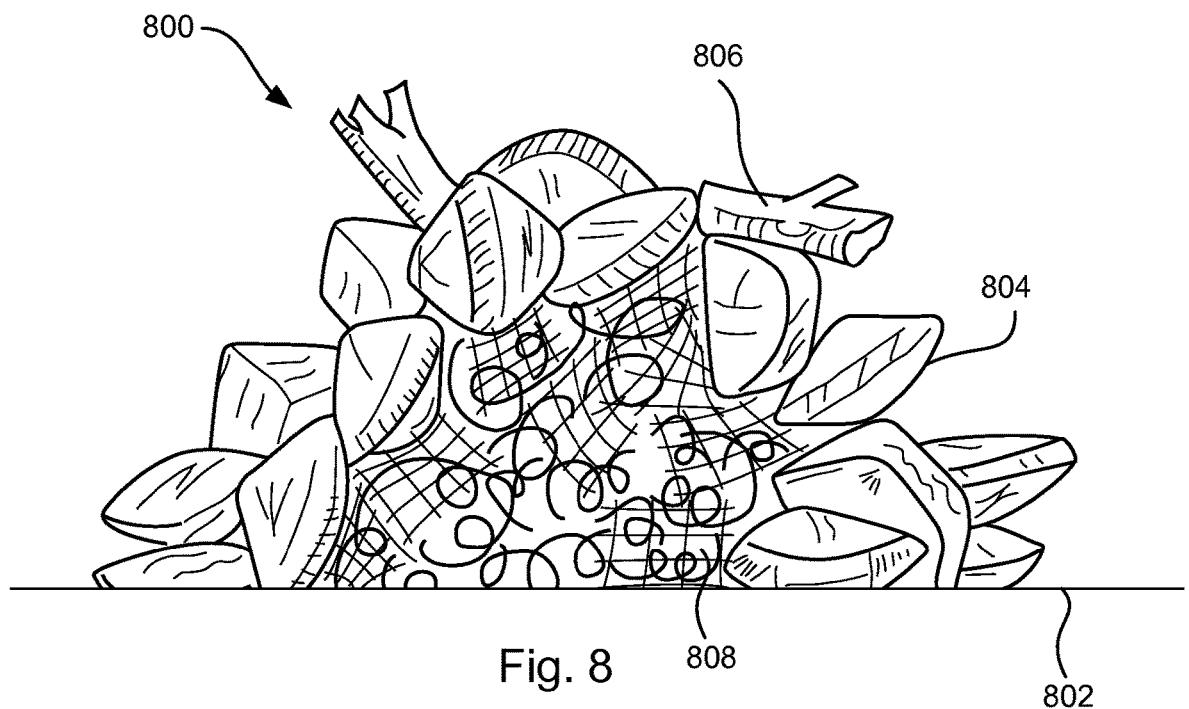
FIG. 8 is a side view of a cooking grill fuel packet for a cooking grill.

FIG. 8 is a side view of a fuel packet 800 for use as the fuel source for the cooking grill. A netting (not shown) holds the fuel packet 800 components together so that they can be stored and/or placed on the fuel support rack 802. The various components of the fuel packet 800 may include paper, charcoal 804, wood chips 806, coal or other flammable materials. The netting can be made of a cotton or natural fiber such as hemp that will combust when the fuel is ignited yet will not release a residue or noxious odors that may interfere with the taste of the food cooked on the cooking grill. As an ignition accelerator, steel wool pads 808 are contained within the fuel packet 800 so that when the electrical charge is engaged from the closing of the electrical circuit, the steel wool pads 808 ignite causing the initial heat and flame that ignites the charcoal briquettes 804 and wood chips 806 that lights these items in the combustion chamber of the cooking grill.

Figure 9:
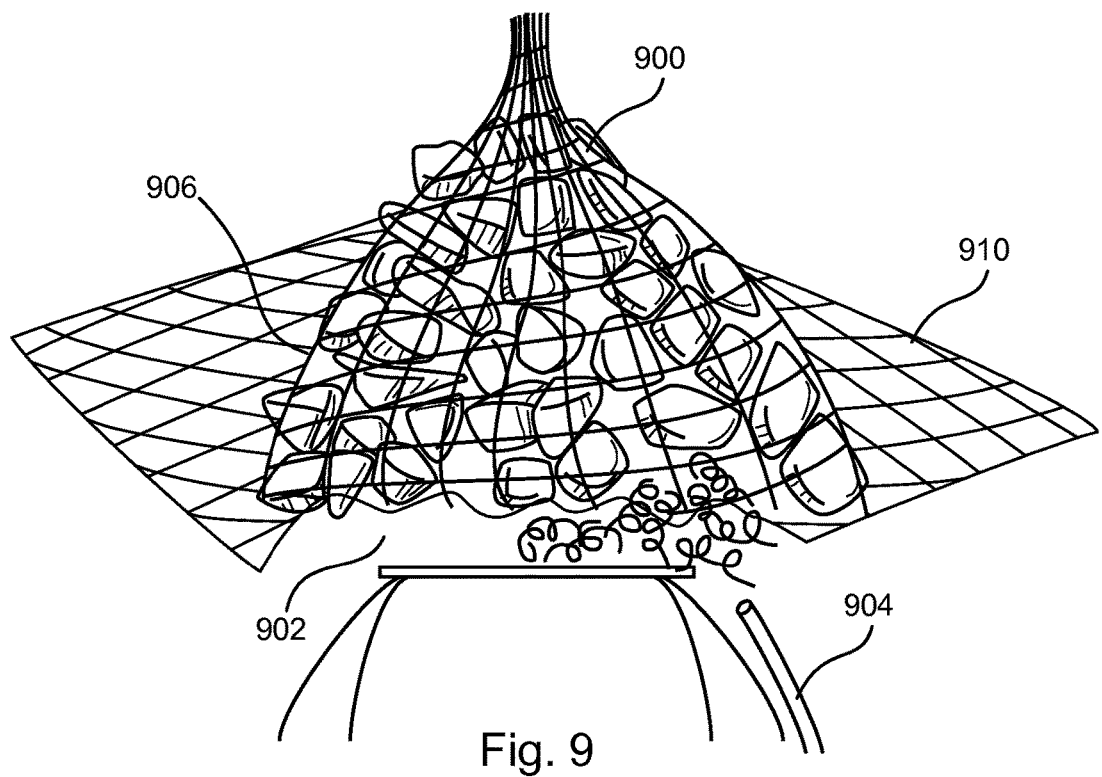
FIG. 9 is a perspective view of the cooking grill fuel packet with the fuel ignition system.

FIG. 9 is a perspective view of a fuel packet 900 placed in the combustion chamber 902 within a cooking grill. A fuel ignition system comprising a protective tube 904 may be positioned below the fuel packet 900. A netting 906 holds the cooking fuel comprising wood and/or charcoal as well as steel wool pads into a compact unit that is easy to store and place into the fuel support rack 908 and the cooking grill 910. The netting 906 also keeps the fuel in a relatively compact space or area that aids in its ignition.

Figure 10:
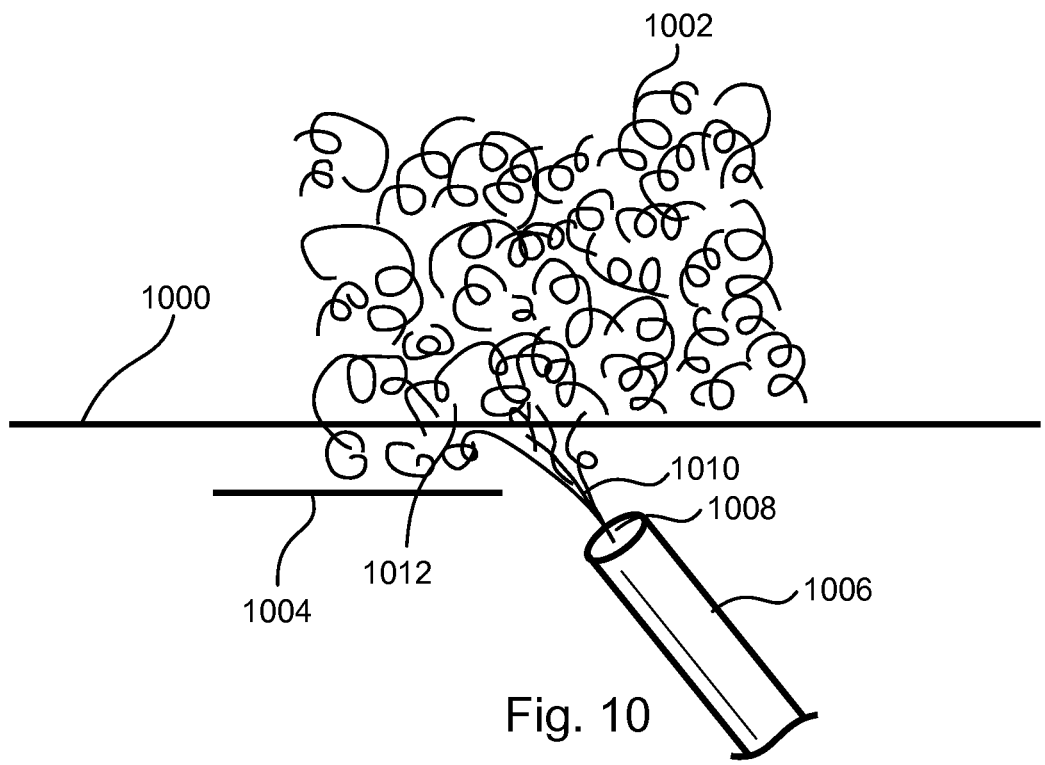
FIG. 10 is side view of the cooking grill fuel packet with the fuel ignition system.
Figure 11:
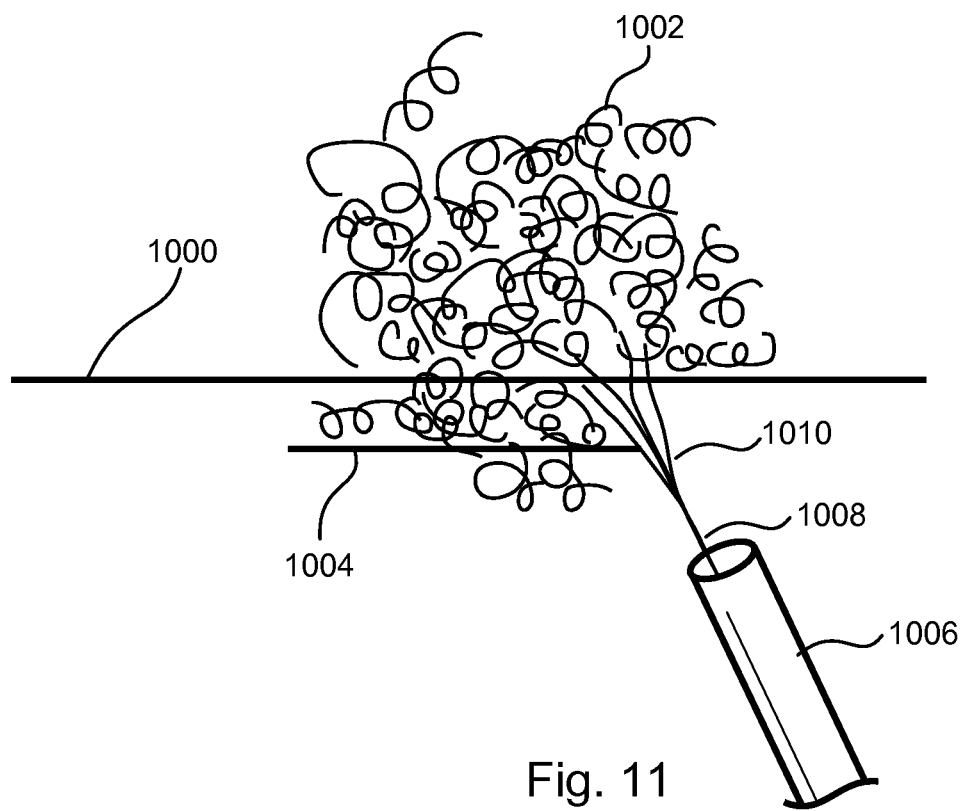
FIG. 11 is side view of the cooking grill fuel packet with the fuel ignition system.

FIGS. 10 and 11 are side views of the cooking grill 1000 having a fuel packet 1002 positioned on the fuel support rack 1000 and 1004. Depending upon the amount of fuel used (e.g., the number of fuel packets 1002) part of the fuel packet 1002 may extend and be positioned on the fuel support rack 1000 and 1004. A fuel ignition system is positioned below, adjacent or above the fuel support rack 1004. A protective tube 1006 houses the ridged wire that when the push button is depressed the end of the ridged wire 1008 protrudes from the protective tube 1006. The ridged wire ends may be forked so that a plurality of ignition wires 1010 extend beyond the protective tube 1006 so as to engage and come into contact with steel wool pads 1012 that are in the fuel packet 1002. The protective tube 1006 may be constructed of a heat resistant ceramic or high melting point metal or metal alloy material which acts to protect the plurality of ignition wires 1010 after the ignition wires 1010 have ignited the steel wool pads 1012 within the fuel packet 1002.

The ignition wires 1010 which are engaged with the push button shown in FIG. 4, can extend out from the protective tube 1006. When the ignition wires 1010 engage with the steel wool pads 1012 they ignite providing heat and flames to the wood chips and charcoal contained within the fuel packet 1002. The ignition wires 1010 may be constructed so that a maximum amount of contact occurs between the ignition wires 1010 and steel wool pads located in the fuel packet 1002.

When a user seeks to ignite the fuel packet 1002, the button can be depressed which extends the ignition wire up inside the fuel packet 1002 so that the ignition wires come into contact with steel wool pads located in the fuel packet 1002. When electrical current from a battery source such as a six (60 or nine (9) volt battery is applied to the ignition wire, the electric current ignites the steel wool pads 1012 positioned in the fuel packet 1002. FIG. 11 illustrates the ignition wires 1010 extending further up into the steel wool pads 1012.

While various embodiments of the invention have been described, it will be apparent to those of ordinary skill in the art that many more embodiments and implementations are possible that are within the scope of this invention.

What is claimed is:

1. A cooking grill, comprising:
an outer housing having a cooking grill positioned above a combustion chamber for cooking food;
an air diverter electrically isolated from the outer housing positioned below a fuel basket holding fuel and at least one ignition pad where the air diverter forms a narrow tapered cylinder;
a fan is positioned within a lower housing assembly which is positioned below the combustion chamber, the fan coupled to a fan drive systems further comprising a variable speed motor for rotating the fan which pulls inlet air through a plurality of openings in the lower housing assembly and outputs a variable amount of air to the bottom of the fuel; an ash can positioned below the lower housing assembly such that ash from the combustion chamber passes through the lower housing assembly and into the ash can; and
an electro-mechanical pulse generator further comprising an ignition wire and power source where the ignition wire can be extended from, and retracted into a protection tube such that the ignition wire extends into the combustion chamber and where the ignition wire can convey electrical energy from the power source to carbon steel fibers forming the at least one ignition pad.

2. The cooking grill of claim 1, where the fan is positioned outside the combustion chamber.

3. The cooking grill of claim 1, where the electrical power source is a battery.

4. The cooking grill of claim 1, further including a fuel basket that holds fuel for the grill.

5. The cooking grill of claim 1, further including the air diverter directs air to fuel positioned in the fuel basket.

* * * * *